US012253782B2

(12) United States Patent
Van Heugten et al.

(10) Patent No.: US 12,253,782 B2
(45) Date of Patent: Mar. 18, 2025

(54) AUGMENTED REALITY DEVICE WITH ADJUSTABLE ELECTROACTIVE BEAM SPLITTER

(71) Applicant: e-Vision Smart Optics, Inc., Sarasota, FL (US)

(72) Inventors: Anthony Van Heugten, Sarasota, FL (US); Anita Trajkovska-Broach, Christiansburg, VA (US); Harry Milton, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 0 days.

(21) Appl. No.: 18/337,865

(22) Filed: Jun. 20, 2023

(65) Prior Publication Data

US 2024/0061300 A1    Feb. 22, 2024

Related U.S. Application Data

(63) Continuation of application No. 17/225,733, filed on Apr. 8, 2021, now Pat. No. 11,681,193, which is a
(Continued)

(51) Int. Cl.
*G02F 1/137* (2006.01)
*G02F 1/13* (2006.01)
(Continued)

(52) U.S. Cl.
CPC ........ *G02F 1/13718* (2013.01); *G02F 1/1306* (2013.01); *G02F 1/13355* (2021.01); *G06T 19/006* (2013.01)

(58) Field of Classification Search
CPC .............. G02F 1/13718; G02F 1/1306; G02F 1/13355; G06T 19/006
See application file for complete search history.

(56) References Cited

U.S. PATENT DOCUMENTS 6,456,438 B1     9/2002   Lee et al.
11,681,193 B2    6/2023   Heugten et al.
(Continued)

FOREIGN PATENT DOCUMENTS

CN     104423039 A    3/2015
JP     2001100196 A   4/2001
(Continued)

OTHER PUBLICATIONS

Examiner Report in Canadian Application No. 3,115,076 dated Oct. 3, 2023, 4 pages.
(Continued)

*Primary Examiner* — Donald L Raleigh
(74) *Attorney, Agent, or Firm* — Smith Baluch LLP (57) ABSTRACT

Bright ambient light can wash out a virtual image in a conventional augmented reality device. Fortunately, this problem can be prevented with a variable electro-active beam splitter whose reflect/transmit ratio can be varied or switched on and off rapidly at a duty cycle based on the ambient level. As the ambient light gets brighter, the beam splitter's transmit/reflect ratio can be shifted so that the beam splitter reflects more light from the display and transmits less ambient light to the user's eye. The beam splitter can also be switched between a highly reflective state and a highly transmissive state at a duty cycle selected so that the eye spends more time integrating reflected display light than integrating transmitted ambient light. The splitting ratio and/or duty cycle can be adjusted as the ambient light level changes to provide the optimum experience for the user.

17 Claims, 12 Drawing Sheets

Related U.S. Application Data continuation of application No. PCT/US2019/055083, filed on Oct. 8, 2019.

(60) Provisional application No. 62/742,800, filed on Oct. 8, 2018.

(51) Int. Cl.
    *G02F 1/1335*     (2006.01)
    *G06T 19/00*     (2011.01)

(56) References Cited

U.S. PATENT DOCUMENTS

| | | | |
|---|---|---|---|
| 2008/0259232 | A1 | 10/2008 | Kim et al. |
| 2015/0260992 | A1* | 9/2015 | Luttmann .......... G02B 27/0172 359/633 |
| 2016/0131903 | A1 | 5/2016 | Kollin |
| 2017/0307809 | A1 | 10/2017 | Gao et al. |
| 2017/0307890 | A1 | 10/2017 | Wang et al. |
| 2018/0003966 | A1* | 1/2018 | Kilcher ................ G02F 1/15 |
| 2018/0045955 | A1 | 2/2018 | Alexander et al. |
| 2020/0020165 | A1* | 1/2020 | Tran .................... G06F 3/011 |

FOREIGN PATENT DOCUMENTS

| | | |
|---|---|---|
| JP | 2008268848 A | 11/2008 |
| WO | 2013062655 A1 | 5/2013 |
| WO | 2015077019 A1 | 5/2015 |
| WO | 2015184413 A1 | 12/2015 |

OTHER PUBLICATIONS

Extended European Search Report dated Jun. 8, 2022 in European Application No. 19872203.5 9 pages.
International Search Report and Written Opinion in International Patent Application No. PCT/US2019/055083 mailed Jan. 9, 2020, 13 pages.
Lincoln, et al., "Scene-adaptive high dynamic range display for low latency augmented reality." Proceedings of the 21st ACM SIGGRAPH Symposium on Interactive 3D Graphics and Games. ACM, 2017. 7 pages.
Maimone et al., "Computational augmented reality eyeglasses." 2013 IEEE International Symposium on Mixed and Augmented Reality (ISMAR). IEEE, 2013. 10 pages.
Notification of Reasons of Refusal with translation in Japanese Appl. No. 2021-518109 dated Sep. 11, 2023, 6 pages.
Office Action with translation in Japanese Application No. 2021-518109 dated Apr. 10, 2023, 14 pages.
Wang et al., "Augmented reality with image registration, vision correction and sunlight readability via liquid crystal devices," Nature Scientific Reports, vol. 7, Mar. 27, 2017, 12 pages.
Zhu et al., "High-ambient-contrast augmented reality with a tunable transmittance liquid crystal film and a functional reflective polarizer," Journal of the Society for Information Display, Mar. 2016, 5 pages.
Office Action (NOA) and Search Report with English Translation in Chinese Application No. 201980064914.5 dated Feb. 26, 2024, 8 pages.
Korean Office Action in Korean App. No. 10-2021-7012034 dated Jun. 24, 2024, 18 pages.

* cited by examiner

AUGMENTED REALITY DEVICE WITH ADJUSTABLE ELECTROACTIVE BEAM SPLITTER

CROSS-REFERENCE TO RELATED APPLICATIONS

This application is a continuation of U.S. application Ser. No. 17/225,733, filed Apr. 8, 2021, which is a bypass continuation of International Application No. PCT/US2019/055083, filed Oct. 8, 2019, which claims priority, under 35 U.S.C. 119(e), to U.S. Application No. 62/742,800, filed Oct. 8, 2018. Each of these applications is incorporated herein by reference in its entirety.

BACKGROUND

An augmented reality device allows the user to view the real world with a virtual image superimposed upon a view of the real world. In a typical augmented reality device, a beam splitter or beam combiner brings together light from the real world and light from a display. The light from the display appears as the virtual image.

Beam splitters and beam combiners are only partial reflectors of light. That is, they transmit and reflect incident light. If a beam splitter has two input ports—one for the light from the real world and one for the light from display—and two output ports, it will send some light from each input port through each output port. This attribute allows light from the real world and the display to be combined at a ratio set by the beam-splitting ratio (e.g., 50/50).

Unfortunately, this attribute also causes problems when the ambient light level fluctuates. If the ambient light from the real world is much brighter than the light from the display, it may be difficult to see the virtual image. One solution to this problem is to increase the brightness of the display (the virtual image source). Unfortunately, increasing the display brightness leads to undesired increases in the size, weight, power consumption, and/or cost of the augmented reality device.

SUMMARY

The present technology provides a solution to the problem of bright ambient light washing out the virtual image in an augmented reality device. By utilizing an electro-active beam splitter whose reflect/transmit ratio can be varied or switched on and off rapidly, more light from the virtual image source can be reflected toward the eye while the amount of light coming from the real world may be reduced, increasing the ratio of virtual image light to real world image light, making the virtual image appear brighter when in bright ambient light conditions. For example, the splitting ratio of the variable beam splitter combiner may be continuously adjustable to balance the light from the real world and virtual image sources based on the ambient light level. If the real-world light is twice as bright as the virtual image light, the beam splitter could be adjusted to transmit 33% of the real-world light and reflect 67% of the virtual image light, restoring visibility balance.

The variable beam splitter/combiner may switch from full transmission of real-world light to full reflection of virtual image light more quickly than the user can perceive the switching (i.e., faster than the flicker fusion threshold). While the beam splitter is switching above this threshold, the user observes the images from the real world and the virtual world as one. In this mode, the balance of light intensity may be adjusted by adjusting the duty cycle, or the ratio of the amount of time being in reflect mode versus transmit mode. For example, 10 milliseconds of transmit mode and 20 milliseconds of reflect mode cause a real-world scene that is in reality twice as bright as the virtual image appear to be appear equally bright as the virtual image.

An example of this type of variable beam splitter can be used in an augmented reality device that also includes a display, a controller, and a photodetector operably coupled to the controller. In operation, the photodetector senses an ambient light level. The variable beam splitter, which is operably coupled to the controller and in optical communication with the display, reflects light from the display and transmits ambient light to a user's eye in a proportion determined by the controller based on the ambient light level.

The variable beam splitter may comprise at least one liquid crystal layer sandwiched between a pair of substrates. For example, the variable beam splitter may include at least two liquid crystal layers: a first cholesteric liquid crystal layer having a first chirality; and a second cholesteric liquid crystal layer, parallel to and in optical communication with the first cholesteric liquid crystal layer, having a second chirality opposite the first chirality. It may also include a polarizer structure in optical communication with the liquid crystal layer(s). This polarizer structure has adjacent polarizing and non-polarizing sections, each of which has a width and a height on the order of microns in size.

The controller may switch the variable beam splitter between a first splitting ratio and a second splitting ratio at a rate faster than a flicker fusion threshold of the user and a duty cycle selected to provide the proportion determined by the processor based on the ambient light level. The controller can change the duty cycle based on a change in the ambient light level sensed by the photodetector.

An alternative augmented reality device comprises a display, a controller, an ambient light sensor operably coupled to the controller, and a variable transmissive-reflective (transflective) device operably coupled to the controller and in optical communication with the display. Again, the ambient light sensor detects the ambient light level. And the variable transflective device reflects light from the display and transmits ambient light to a user's eye in a proportion determined by the controller based on the ambient light level.

The transflective device may include transmissive and reflective sections. The transmissive section reflects some of the light from the display and transmits some of the ambient light to the user's eye in the proportion determined by the processor based on the ambient light level. The reflective section, which is next to the transmissive section, reflects some of the light from the display to the user's eye and to blocks some ambient light. The transmissive section may include a liquid crystal layer or an electrochromic layer.

The controller can switch the variable transflective device between a first splitting ratio and a second splitting ratio at a rate faster than a flicker fusion threshold of the user and a duty cycle selected to provide the proportion determined by the processor based on the ambient light level. The controller can also change the duty cycle based on a change in the ambient light level sensed by the ambient light sensor.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
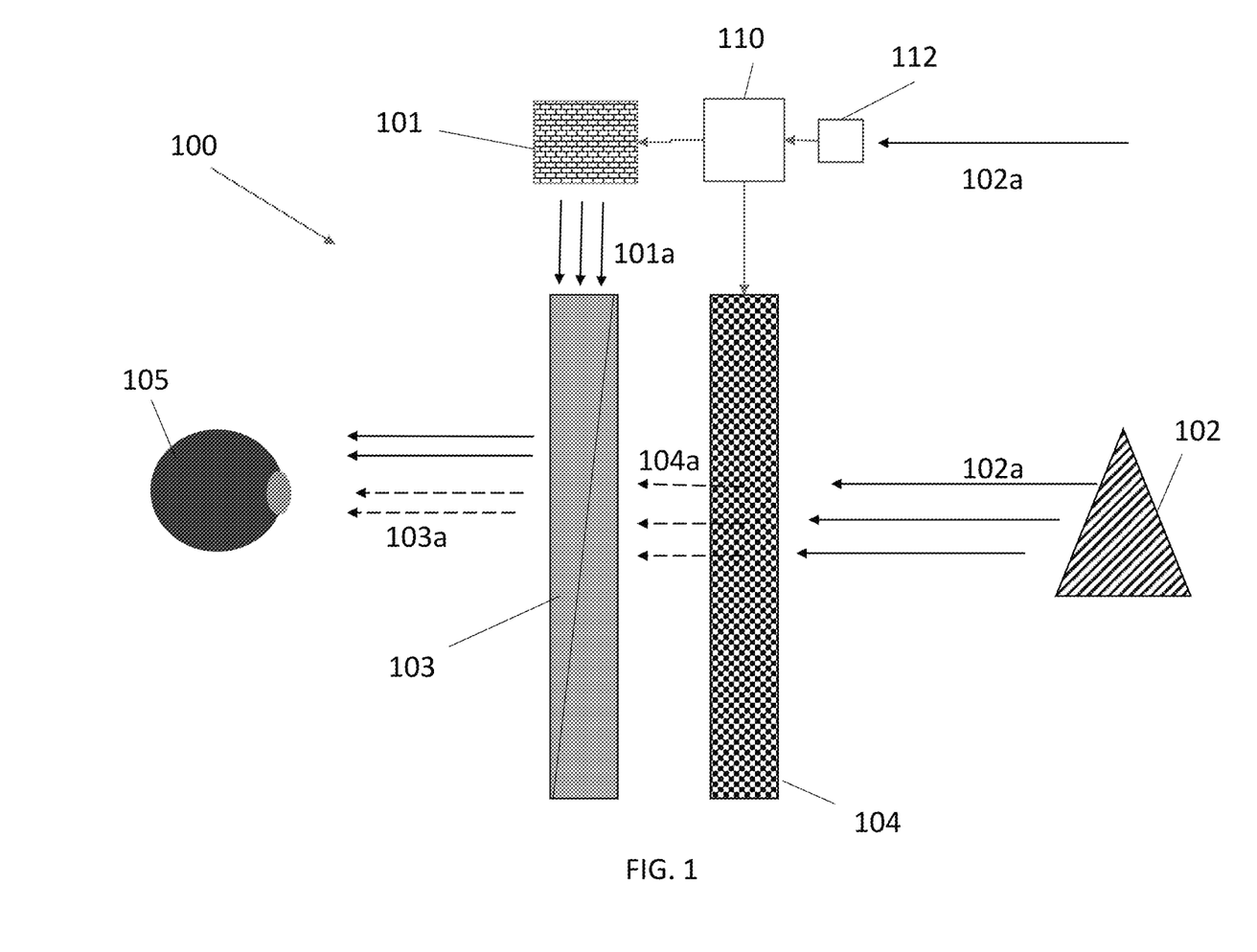
FIG. 1 illustrates an augmented reality device with a variable liquid crystal attenuator to reduce ambient brightness.
Figure 2:
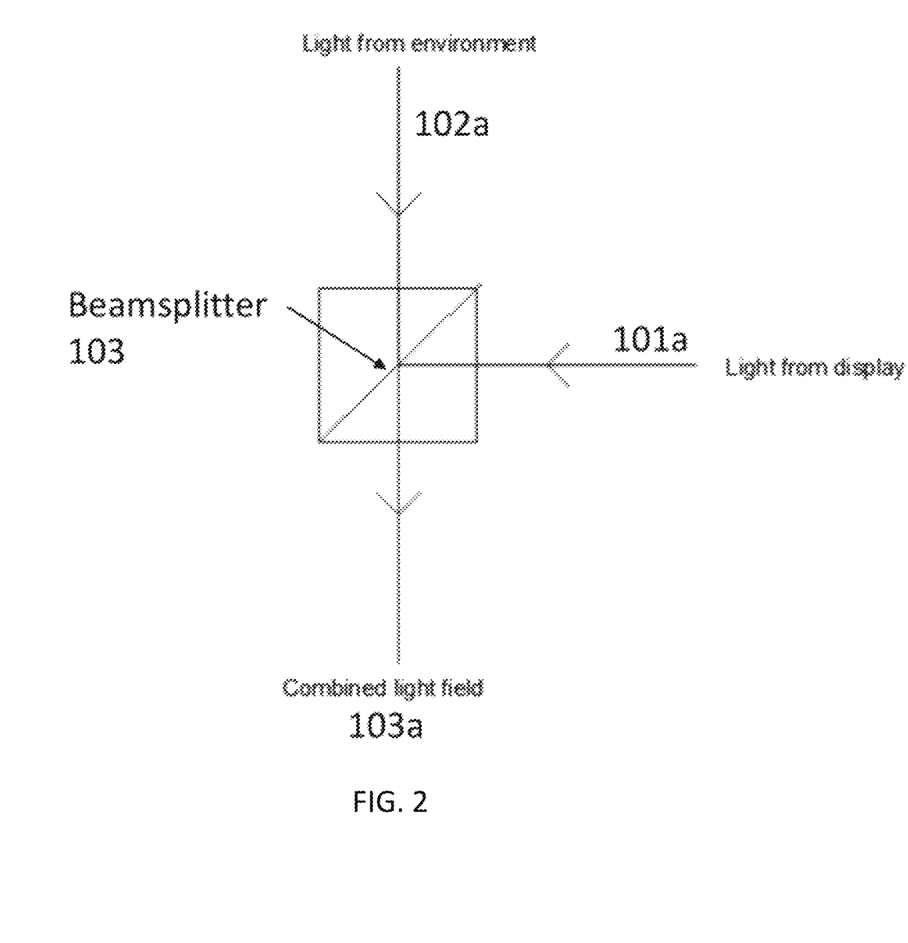
FIG. 2 illustrates the fixed (static) beam splitter in the augmented reality device of FIG. 1.

FIG. 1 shows an augmented reality (AR) device 100 with a beam splitter/combiner 103 that combines light 101a originating from the virtual image source 101, such as a miniature liquid-crystal display (LCD), with ambient light 102a from the real world (real object) 102. The beam splitter 103 typically transmits about 50% of the ambient light 102a and reflects about 50% of the display light 101a toward the user's eye 105 as shown in FIG. 2. To the user, this combined light 103a appears as a virtual image superimposed on the real world object 102. The remaining ambient light 102a and display light 101a propagates out the other port of the beam splitter 103 (not shown).

The AR device 100 also includes a variable electro-active attenuator 104 between the beam splitter 103 and the real world object 102. This attenuator 104 is coupled to a processor or controller 110, which is also coupled to the display 101 and to a photodetector 112. In operation, the photodetector 112 senses incident ambient light 102a. The photodetector 112 produces an electrical signal, such as a photocurrent, that represents the intensity or irradiance of incident ambient light 102a. The controller 110 receives this electrical signal and uses it to change the brightness of the display 101 and/or the transmittance of the attenuator 104.

For example, if the user is wearing the AR device 100 in bright sunlight, the photodetector 112 may detect the bright ambient light 102a, and the controller 101 may increase the brightness of the display 101 and/or decrease the transmittance of the attenuator 104. If the attenuator 104 has a transmittance that is variable (e.g., continuously variable or stepwise variable) between 0% transmissive (only the environment is visible) and 100% transmissive (only the virtual image is visible), the controller 110 may set the transmittance to an intermediate value (e.g., 10%, 20%, 30%, 40%, 50%, 60%, 70%, 80%, 90%, or any other value between 0% and 100%), such as 60%.

If the attenuator 104 has only two settings—e.g., 0% or 100% transmissive—then the controller 110 may cause the attenuator 104 to switch between those settings at a duty cycle selected to decrease the relative brightness of the ambient light 102a. This duty cycle may range between 0% and 100% (e.g., 10%, 20%, 30%, 40%, 50%, 60%, 70%, 80%, 90%, or any other value or range of values between 0% and 100%). For example, the attenuator 104 may switch between settings at a duty cycle of 50% to reduce the apparent brightness of the ambient light 102a by about 50%. Increasing the duty cycle (i.e., increasing the portion of the period during which the attenuator 104 blocks the ambient light 102a) reduces the intensity of ambient light 102a perceived by the user. If the attenuator 104 has more than two settings—e.g., 25%, 50%, or 75% transmissive—then the controller 110 may switch among the settings in a more complicated fashion.

The attenuator 104 switches between settings at a rate faster than the flicker fusion rate or flicker fusion threshold, which is the frequency at which an intermittent light stimulus appears to be completely steady to the average human, so that the switching is imperceptible to the user. Practically, the attenuator 104 may switch between settings at rate of 24 Hz, 25 Hz, 30 Hz, 48 Hz, 60 Hz, 72 Hz, 75 Hz, 100 Hz, or higher.

Variable Beam Splitters for Brightness Control in Augmented Reality Devices

Figure 3:
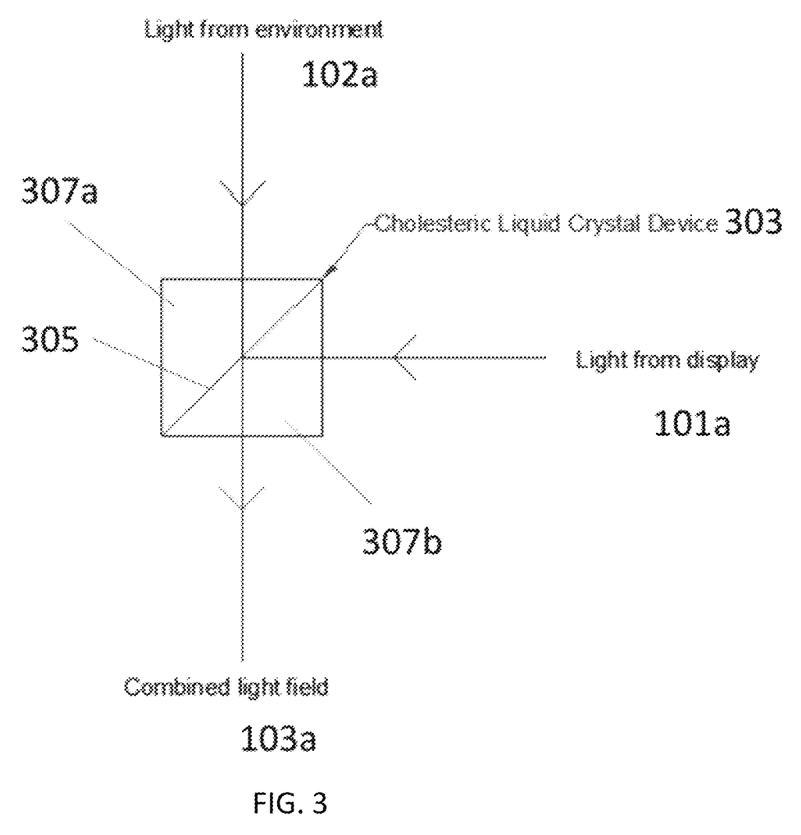
FIG. 3 illustrates a variable beam splitter that can be substituted for the fixed beam splitter and variable liquid crystal attenuator in the augmented reality device of FIG. 1.

FIG. 3 shows a variable beam splitter 303 that can be used instead of the beam splitter 103 and variable electro-active attenuator 104 in the AR device 100 of FIG. 1. The variable beam splitter 303 has one or more cholesteric liquid crystal layers 305 sandwiched between a pair of transparent substrates 307a and 307b. The cholesteric liquid crystals in the cholesteric liquid crystal layer(s) 305 are liquid crystals with a right- or left-handed helical structure. Due to this structure of the liquid crystal, Bragg reflection takes place when the pitch of the liquid crystal helix is of the order of the wavelength of light. The reflection band is specified by the pitch length and the birefringence of the liquid crystal. Reflection occurs for light polarized in the same configuration as the liquid crystal helix structure (i.e., right- or left-hand circularly polarized light for right- and left-handed helixes).

A high birefringence liquid crystal material can reflect light over a wavelength band covering the visible spectrum. Alternatively, several layers of cholesteric liquid crystal with different pitch lengths can reflect light over the entire visible wavelength band, with each layer reflecting a certain wavelength sub-band in the visible spectrum. By ensuring the reflection bands in each layer cover the visible spectrum, the layers together reflect light over the entire visible spectrum.

A standard cholesteric liquid crystal layer reflects approximately 50% and reflects approximately 50% of incident unpolarized light due to the polarization-sensitive nature of the cholesteric liquid crystal material. Two cholesteric liquid crystal layers with opposite chirality (e.g., a layer with right-handed helixes and a layer with left-handed helixes) can reflect 100% of incident unpolarized light. If the helix is unwound, then there is 100% transmission, with the liquid crystal becoming vertically aligned. Winding and unwinding the helix structure modifies the reflectance.

Using one or more pairs cholesteric liquid crystal layers 305 with opposite chiralities in the variable beam splitter 303 in FIG. 3 makes it possible to vary the variable beam splitter's splitting ratio. (The layers 305 may be a single pair of broadband layers or one or more pairs of narrowband layers, depending on the desired wavelength range.) By varying the amount of time that the pair(s) of cholesteric liquid crystal layers 305 spend in the reflective and transmissive states, the ratio of light from the environment and the virtual image can be controlled. For example, if the layers 305 are in the reflective state 75% of the time and in the transmissive state 25% of the time, then the user's eye 105 will sense the display light reflected by the variable beam splitter 303 for three times as long as it senses the ambient light transmitted by the variable beam splitter 303. Adjusting this ratio weights the apparent brightness of the ambient light with respect to the brightness of the virtual image.

As mentioned briefly above, a cholesteric liquid crystal, also called a chiral nematic liquid crystal, is a nematic liquid crystal configuration where the liquid crystal director forms a chiral twisted or helical structure. In some configurations, the liquid crystal system is able to act as a Bragg reflector, and liquid crystal reflects light polarized in the same configuration as the chiral pitch. To meet the Bragg condition for reflected polarized light, the liquid crystal's pitch should be on the order of the wavelength (e.g., about 450 nm to about 750 nm for visible light). The peak of the Bragg reflection at a wavelength of $\lambda_0$ is defined as:

$$\lambda_0 = n_{av} P,$$

where P is the pitch of the liquid crystal structure and $n_{av}$ is the average refractive index of the liquid crystal. For a liquid crystal with an ordinary refractive index of 1.5 and an extraordinary refractive index of 1.8, the liquid crystal pitch should be 333 nm for reflection at 550 nm (the peak response of human vision). The scope of this invention can include liquid crystals with a range of birefringence and pitch lengths, whereby all wavelengths of light in the visible spectrum are reflected depending upon the configuration.

The range of reflected wavelengths ($\Delta\lambda$) is determined by the birefringence of the liquid crystal ($\Delta n$) and the pitch, and is governed by the equation:

$$\Delta\lambda = \Delta n P.$$

For a liquid crystal with an ordinary refractive index of 1.5, an extraordinary refractive index of 1.8, a liquid crystal pitch of 333 nm, the range of reflected light wavelengths is 100 nm. For broadband reflectance in the visible spectrum (e.g., from about 380 nm to about 740 nm), the wavelength range should be 360 nm.

Increasing the birefringence of the liquid crystal or the pitch increases the reflectance wavelength range. Similarly, broadband reflectance can be achieved by stacking together several liquid crystal layers with different peak reflectance wavelengths and shorter wavelength ranges.

The number of pitches in the liquid crystal device for high reflectance at the peak wavelength depends upon the birefringence of the liquid crystal. In the case of a high birefringence liquid crystal (e.g., $\Delta n=0.35$), 90% and higher reflectance can be achieved with four pitches. Reducing the number of pitches for a given reflectance allows a thinner liquid crystal device to be used.

A chiral nematic liquid crystal can be switched using an electric field across the liquid crystal layer. Switching winds and unwinds the liquid crystal's chiral structure. A helical liquid crystal can be in a homeotropic or planar orientation depending upon the liquid crystal dielectric properties and electric field direction. The electric field turns off the reflective properties of the liquid crystal, causing the liquid crystal device (e.g., the variable beam splitter 303 in FIG. 3) to switch between reflective and transmissive states. The liquid crystal's response time increases with the thickness of the liquid crystal layer, so reducing the number of pitches and hence using a thinner liquid crystal layer increases the liquid crystal's switching speed and reduces the liquid crystal's response time.

In operation, the variable beam splitter 303 in FIG. 3 can be coupled to and actuated by the controller 110 in FIG. 1 as described above with respect to the variable electro-active attenuator 104. More specifically, the controller 110 may switch the cholesteric layers 305 between the transmissive and reflective states at a rate equal to or faster than the flicker fusion threshold and at a duty cycle that depends on the photosensor's measurement of the ambient light level.

Figure 4:
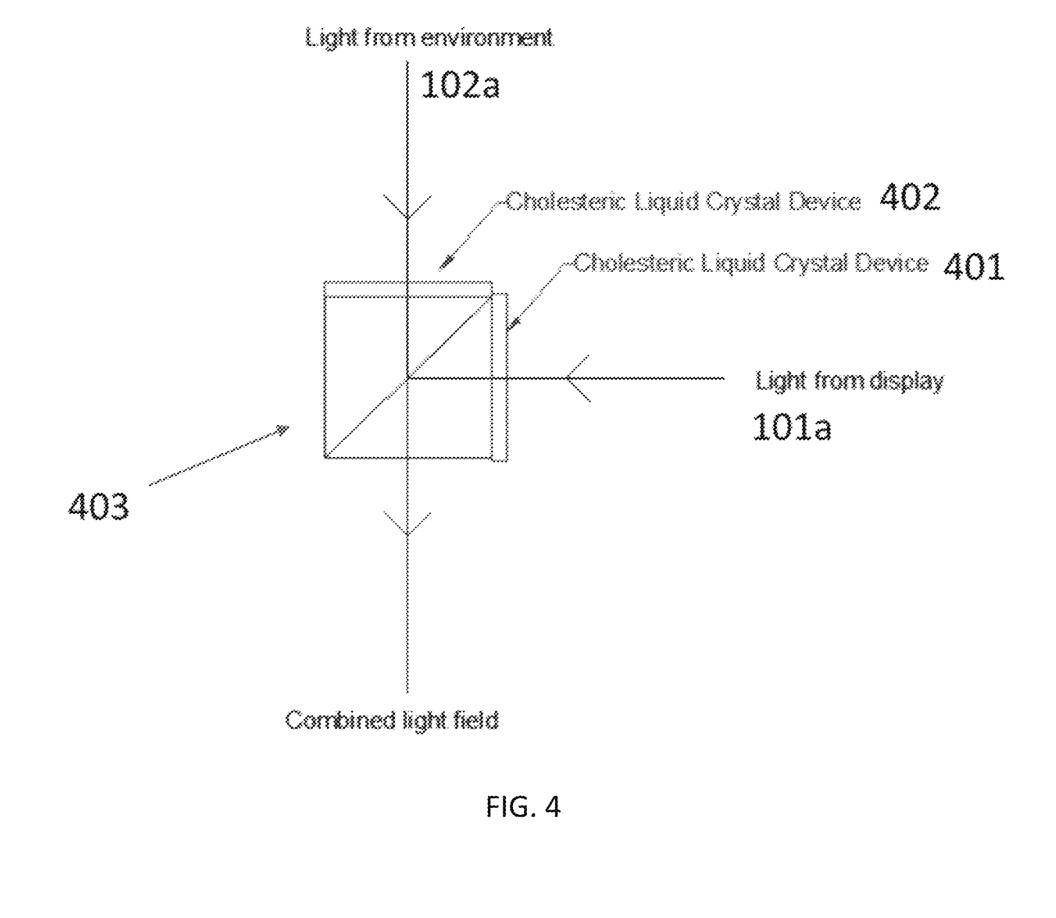
FIG. 4 illustrates a beam splitter with variable cholesteric liquid crystal shutters that can be substituted for the fixed beam splitter and variable liquid crystal attenuator in the augmented reality device of FIG. 1.

FIG. 4 shows an alternative variable beam splitter 403 that can be used instead of the beam splitter 103 and variable electro-active attenuator 104 in the AR device 100 of FIG. 1. It includes a first cholesteric liquid crystal layer 401 on one input port to modulate the intensity of the display light 101a and a second cholesteric liquid crystal layer 402 on the other input port to modulate the intensity of the ambient light 102a. The first and second cholesteric liquid crystal layers 401, 402 independently control the amount of light entering the beam splitter 403 from the environment and the display 101 according to commands from the controller 110 based on the light level readings by the photodetector 112. The controller 110 can optimize the visibility of the virtual image by varying the attenuation ratio provided by the cholesteric liquid crystal devices 401, 402. For example, the controller 110 may drive the cholesteric liquid crystal layers 401 and 402 so that they pulse on and off at a rate faster than the flicker fusion rate and at a duty cycle selected to provide the desired visibility for the virtual image.

Liquid Crystal and Electrochromic Devices

FIGS. 5-9 show liquid crystal and electrochromic devices that can be used as variable attenuators in the AR device 100 and the variable beam splitter 400 of FIG. 4.

Figure 5:
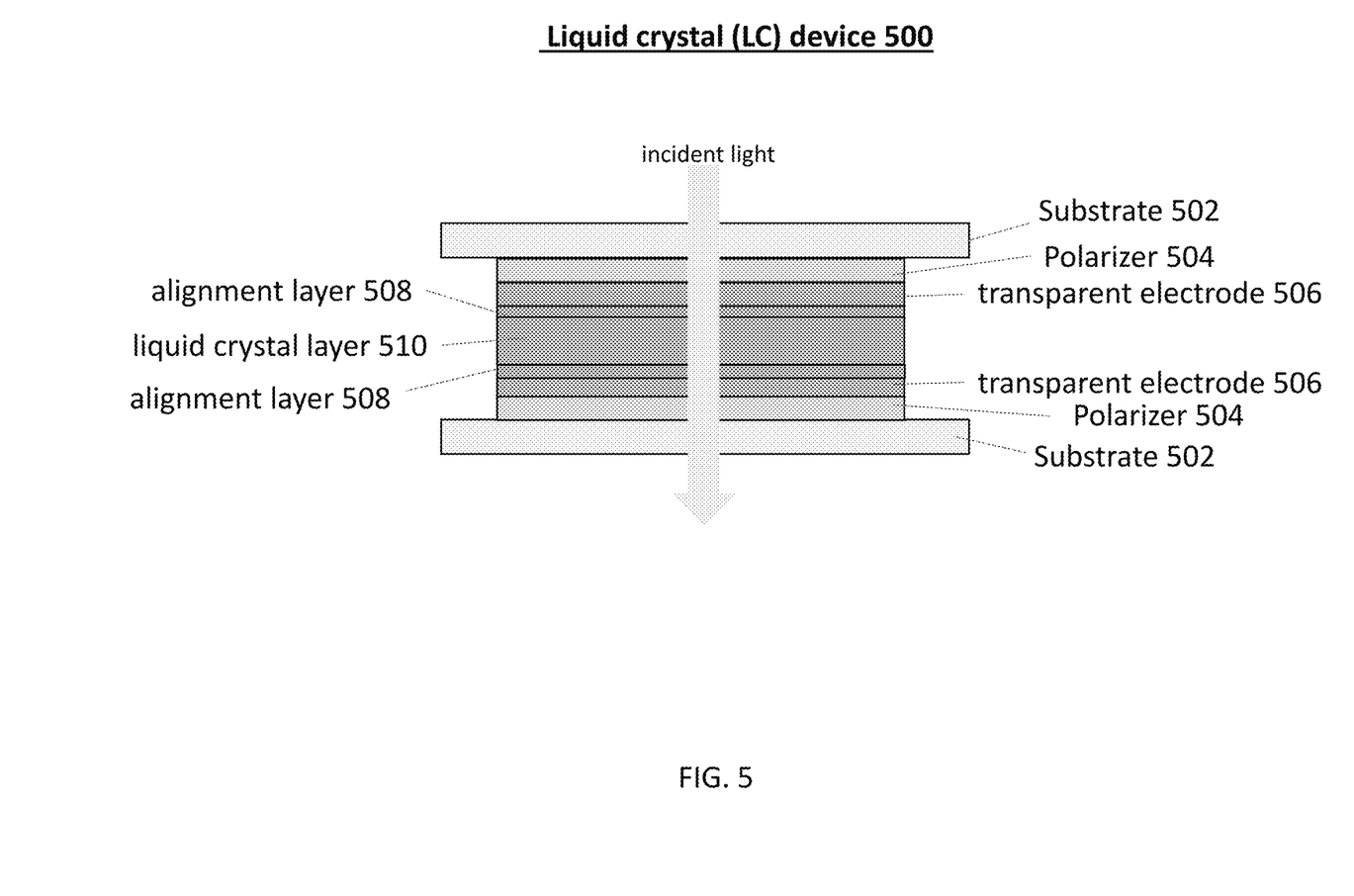
FIG. 5 illustrates a liquid crystal device.

FIG. 5 shows a liquid crystal device 500 with a liquid crystal layer 510 sandwiched between alignment layers 508, transparent electrodes 506, orthogonal or parallel polarizers 504, and substrates 502. The liquid crystal layer 510 can take the form of a twisted nematic, super twisted nematic, planar aligned, or vertically aligned nematic structure. By applying a voltage across the liquid crystal layer 510 with the electrodes 506, or using in-plane switching, the optical transmission for incident unpolarized light can be varied between 50% to 0%.

Figure 6:
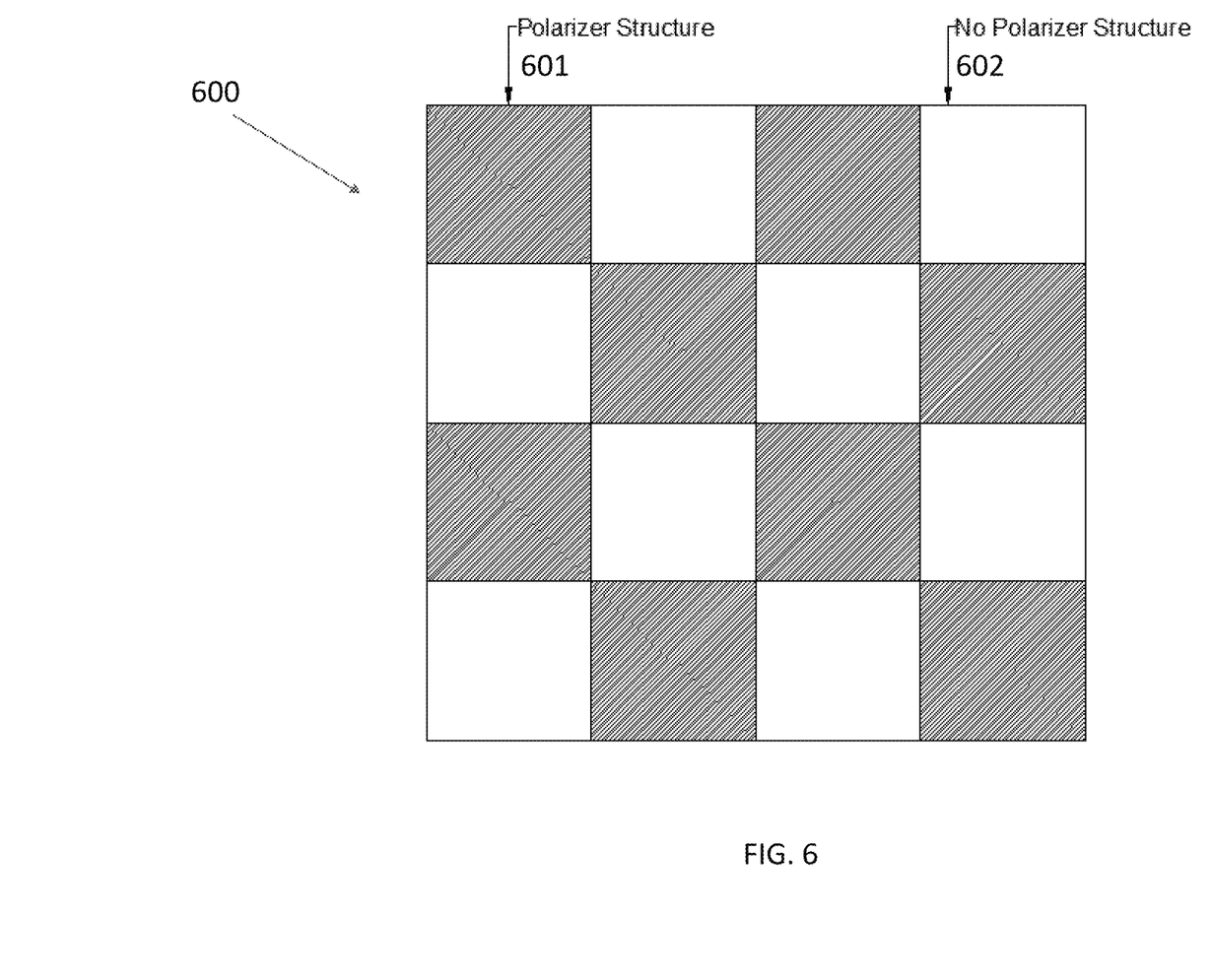
FIG. 6 illustrates a checkerboard polarizer structure for use in a liquid crystal device used as a shutter or variable attenuator for ambient light in an augmented reality system.

FIG. 6 shows a polarizer array 600 that can used in place of either or both of the regular polarizers 504 in the liquid crystal device 500 of FIG. 5. The polarizer array 600 has a checkerboard arrangement of polarizers 601 and clear (non-polarizing) sections 602. (Other arrangements are also possible.) The polarizers 601 and clear sections 602 are too small (e.g., about 15 microns wide by 15 microns high) to be resolved by an observer. The polarizer array 600 can be formed by ablating sections of a thin sheet of polarizer to yield clear sections 602 or by printing polarizing sections 601 on a clear substrate.

Interleaving or alternating the clear sections 602 with the polarizers 601 increases the overall transmission of the polarizer array 600 compared to that of a conventional polarizer when used in a liquid crystal element. For example, if half of the liquid crystal element area contains polarizers 601, and the other half is clear (clear section 602), then the liquid crystal will have a 75% transmission in the off state. By varying the liquid crystal orientation in the polarization-sensitive areas, the liquid crystal element's total transmission can be reduced to 50%. There is hence a compromise between maximum light transmission and transmission range in this system.

Figure 7:
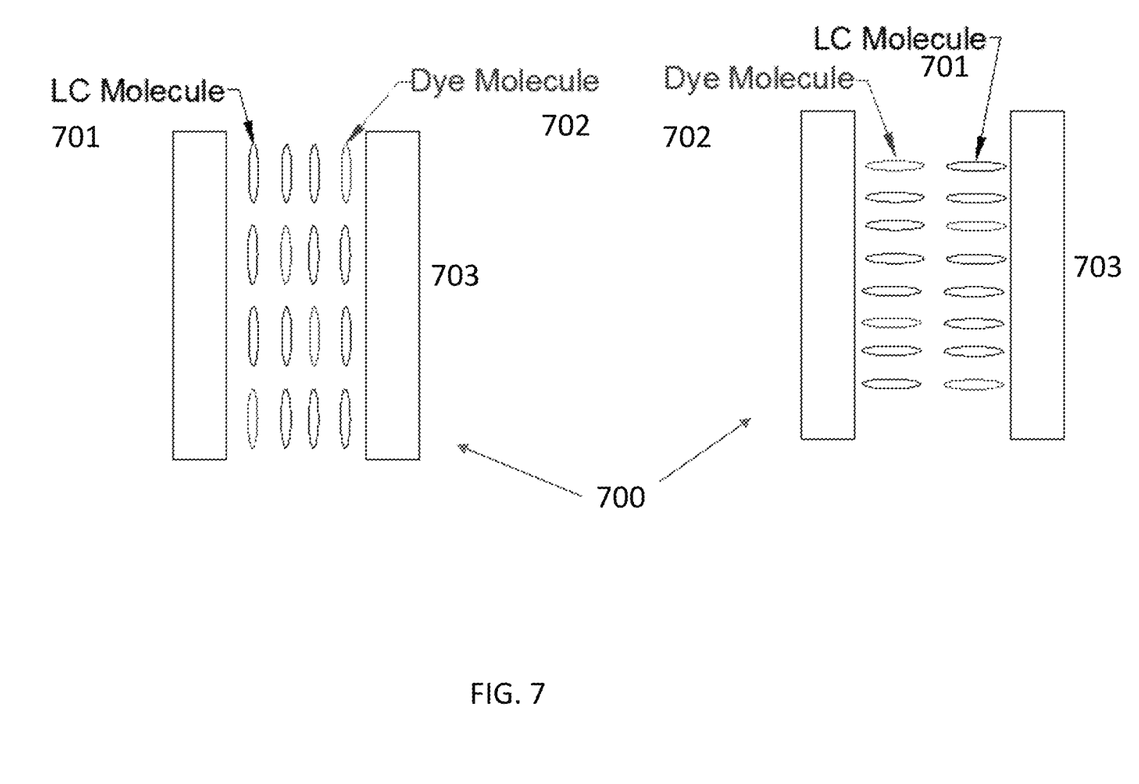
FIG. 7 illustrates alignment of dye and liquid crystal molecules in a liquid crystal device.

FIG. 7 shows two views of a liquid crystal element 700 that includes dichroic dye 702 mixed into liquid crystal material 701 between a pair of substrates 703. In this case, the dichroic dye 702 absorbs light of a certain polarization, either parallel or perpendicular to the long molecular axis of the dye 702. The liquid crystal 701 can be aligned either parallel (left) or perpendicular (right) to the substrates 703, with the dye 702 following the orientation of the liquid crystal 701. For example, in the parallel alignment state (left), light polarized parallel to the direction of the molecular axis of the dye is absorbed, and there is 50% transmission through the liquid crystal element 700. When the liquid crystal 701 is aligned in a perpendicular state (right), the dye molecules 702 are oriented perpendicular to the substrates 703. In this case the molecular axis of the dye 702 is no longer aligned with the polarization of light, and there is 100% transmission. The liquid crystal 701 and dye 702 can be switched between perpendicular and parallel states with in-plane electrodes (not shown) to provide 100% transmission in the off state and 50% transmission in the on state or vice versa, depending on the relaxed orientation of the liquid crystal 701 and dye 702.

Figure 8:
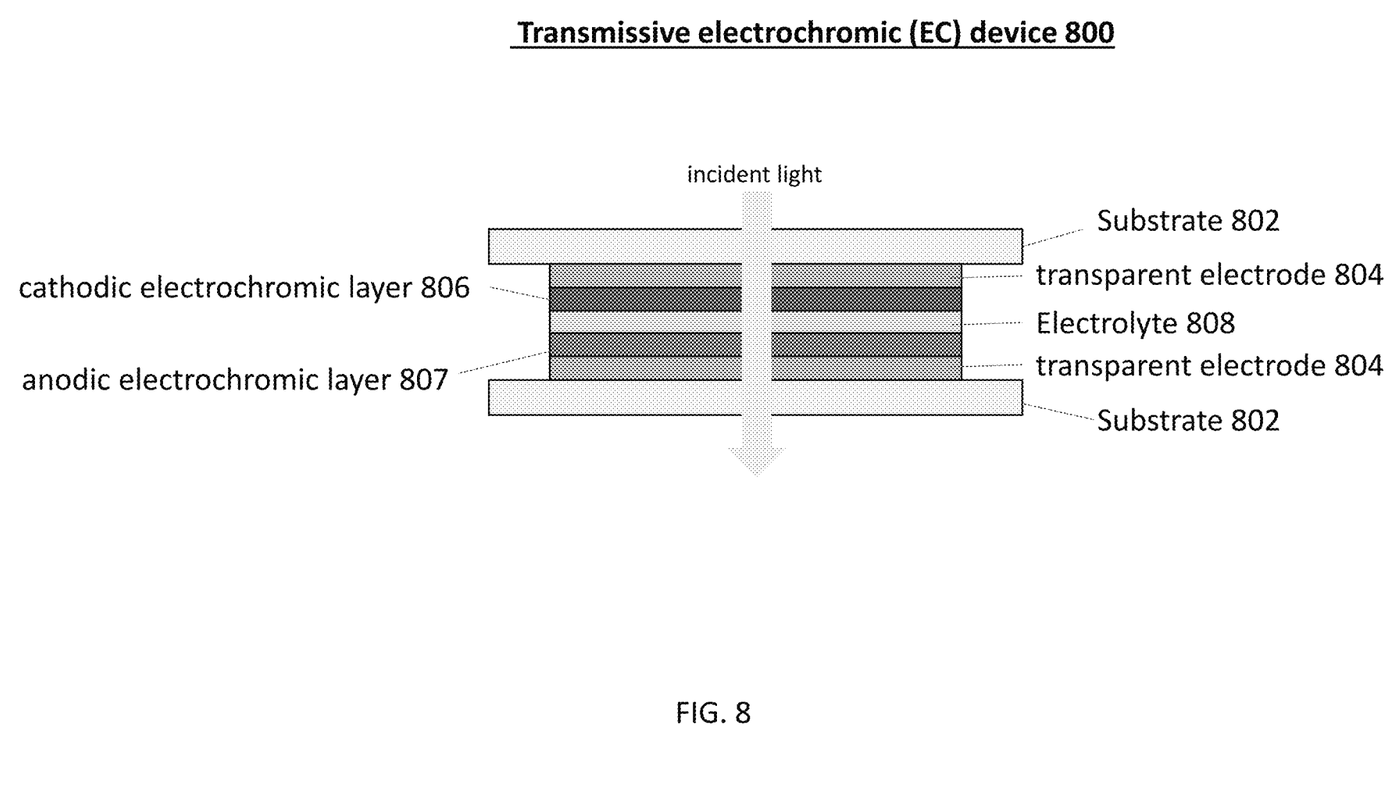
FIG. 8 illustrates a transmissive electrochromic device.

FIG. 8 shows a transmissive electrochromic (EC) device 800 with an electrolyte layer 808 sandwiched between a cathodic electrochromic layer 806 and an anodic electrochromic layer 807, which in turn are between transparent electrodes 804 and substrates 802. This EC device 800 can be used to control the light intensity from the environment or display source in an AR device. Applying a voltage to the EC device 800 causes the electrochromic layers 806 and 807 to undergo certain redox reactions and change color. The overall transmission (color) of the EC device 800 changes, e.g., from a transparent (clear) state to dark color state and vice versa. This effect can be used to control the ambient light transmitted to or through a beam splitter in an AR device.

Figure 9:
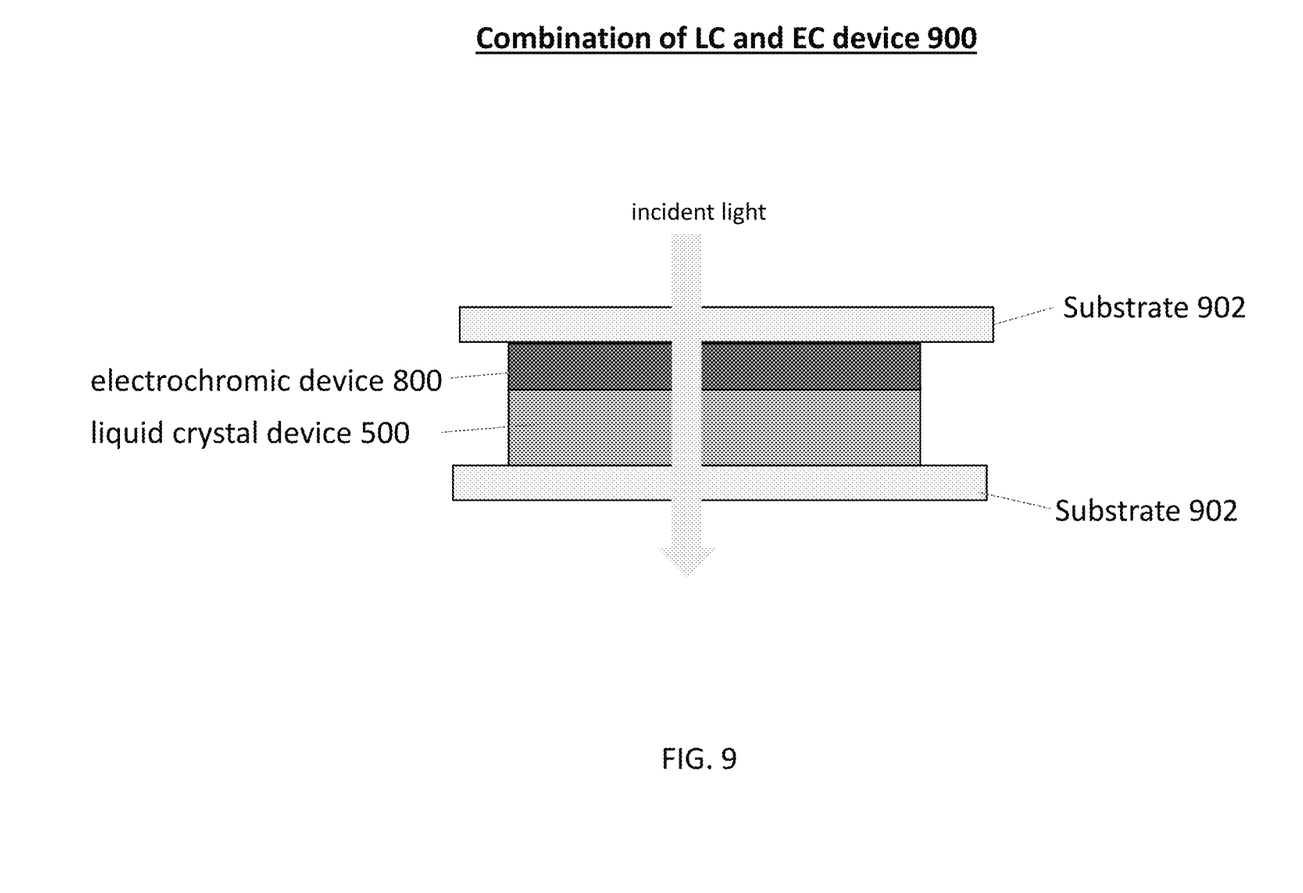
FIG. 9 illustrates a combined transmissive liquid crystal and electrochromic device.

FIG. 9 shows a combined EC/liquid crystal device 900. It includes an electrochromic device 800 and a liquid crystal 500 in optical series between a pair of clear substrates 902. These substrates 902 may replace or augment the outer substrates in the electrochromic device 800 and liquid crystal device 500.

Figure 10:
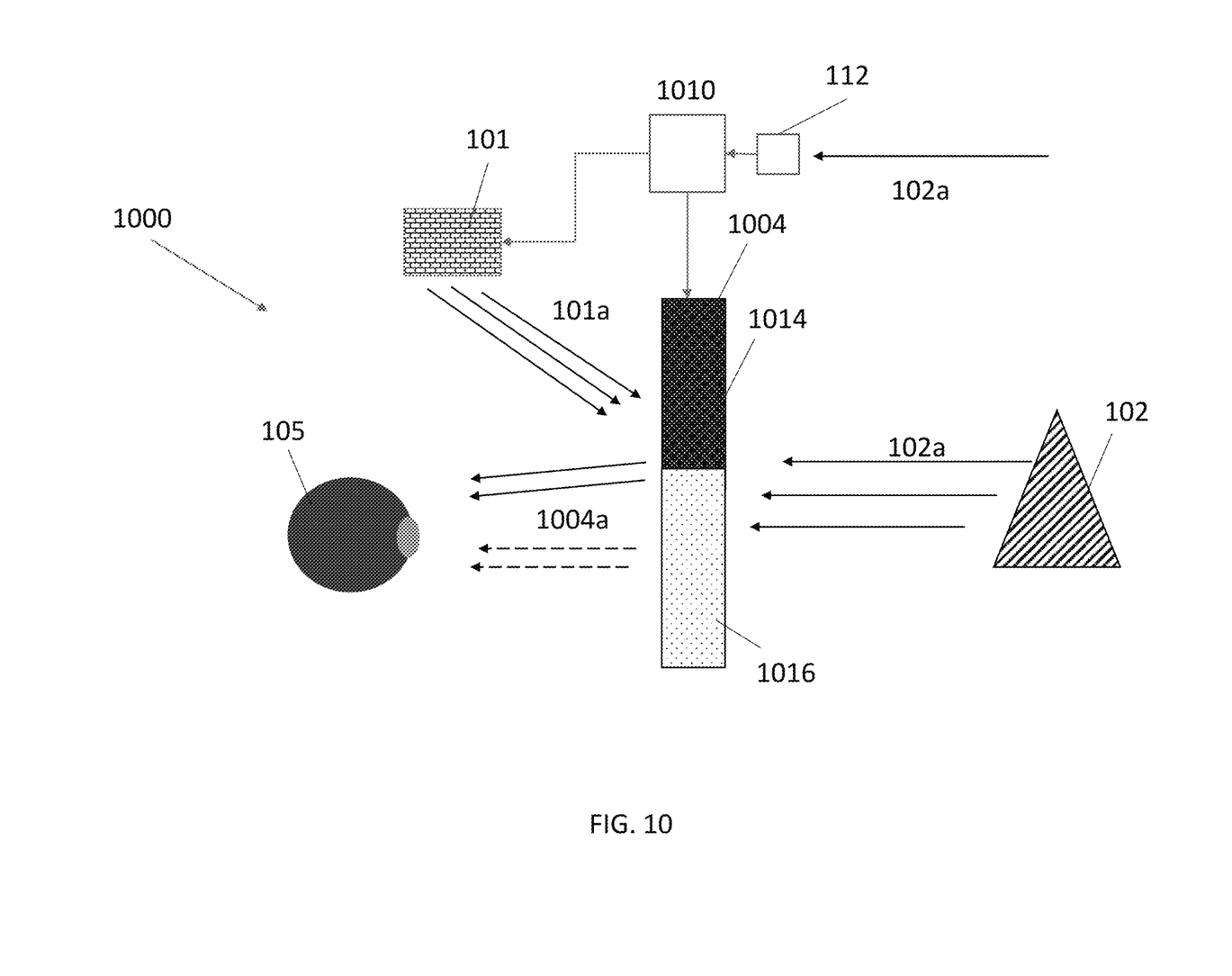
FIG. 10 illustrates an augmented reality device with a transmissive-reflective (transflective) for controlling the brightness of ambient illumination.

Transmissive-Reflective (Transflective) Electro-Active Devices for Augmented Reality FIG. 10 shows an AR device 1000 with an electro-active trans-reflective (transflective) device 1004 for controlling the ratio of light originating from the real world object 102 to the light originating from the virtual image source 101. The transflective electro-active device 1004 is coupled to a controller 1010 and has a variable transmissive section 1016 next to a reflective section 1014. The reflective section 1014 reflects light 101a from the virtual image source 101 to the user's eye 105. The reflective section 1014 may have a fixed or electrically tunable reflectivity. If fixed, the reflectivity may be less than 100% so that virtual image formed by the light 101a from the virtual image source 101 appears superimposed over at least part of the real-world object 102 or scene. If variable, the reflectivity may be adjusted to a level or switched at a duty cycle selected by the controller 1010 based on the ambient light level measured by the photodetector 112 to make the virtual image appear dimmer or brighter with respect to the real-world scene.

The variable transmissive section 1016 of the transflective device 1004 controls the intensity of light 102a from a real-world object 102 that reaches the user's eye 105. The controller 1010 sets the transmissivity of the variable transmissive section 1016 based on the ambient light level measured by the photodetector 112. For example, the controller 1010 may set the variable transmissive section's transmissivity to a given level (e.g., any level between 0% and 100%) to make the virtual image appear dimmer or brighter with respect to the real-world scene. If the variable transmissive section's transmissivity is switched among two discrete levels (e.g., a "clear" state and a "dark" state), the controller 1010 may switch the variable transmissive section's transmissivity between those levels at a duty cycle selected to make the virtual image appear dimmer or brighter with respect to the real-world scene.

Figure 11:
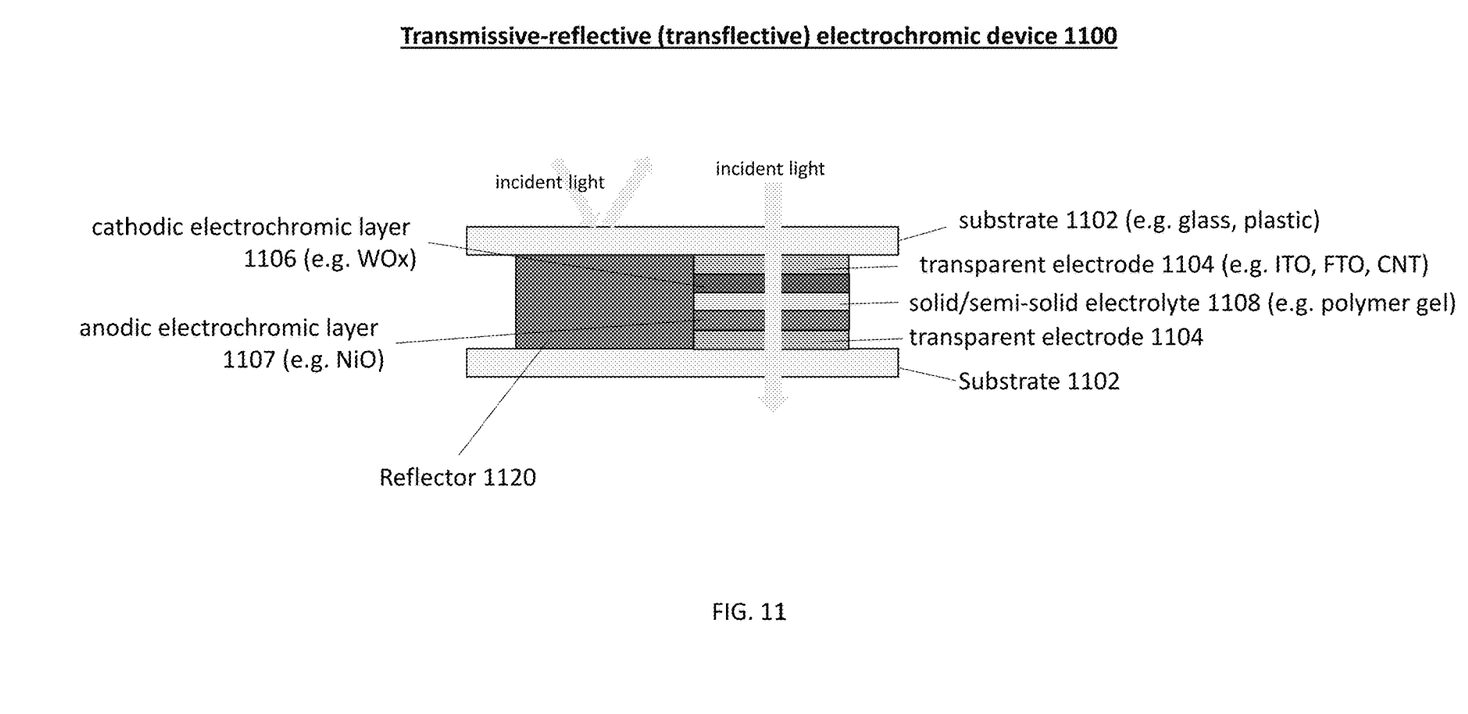
FIG. 11 illustrates a transflective electrochromic device suitable for use in the augmented reality device of FIG. 10.
Figure 12:
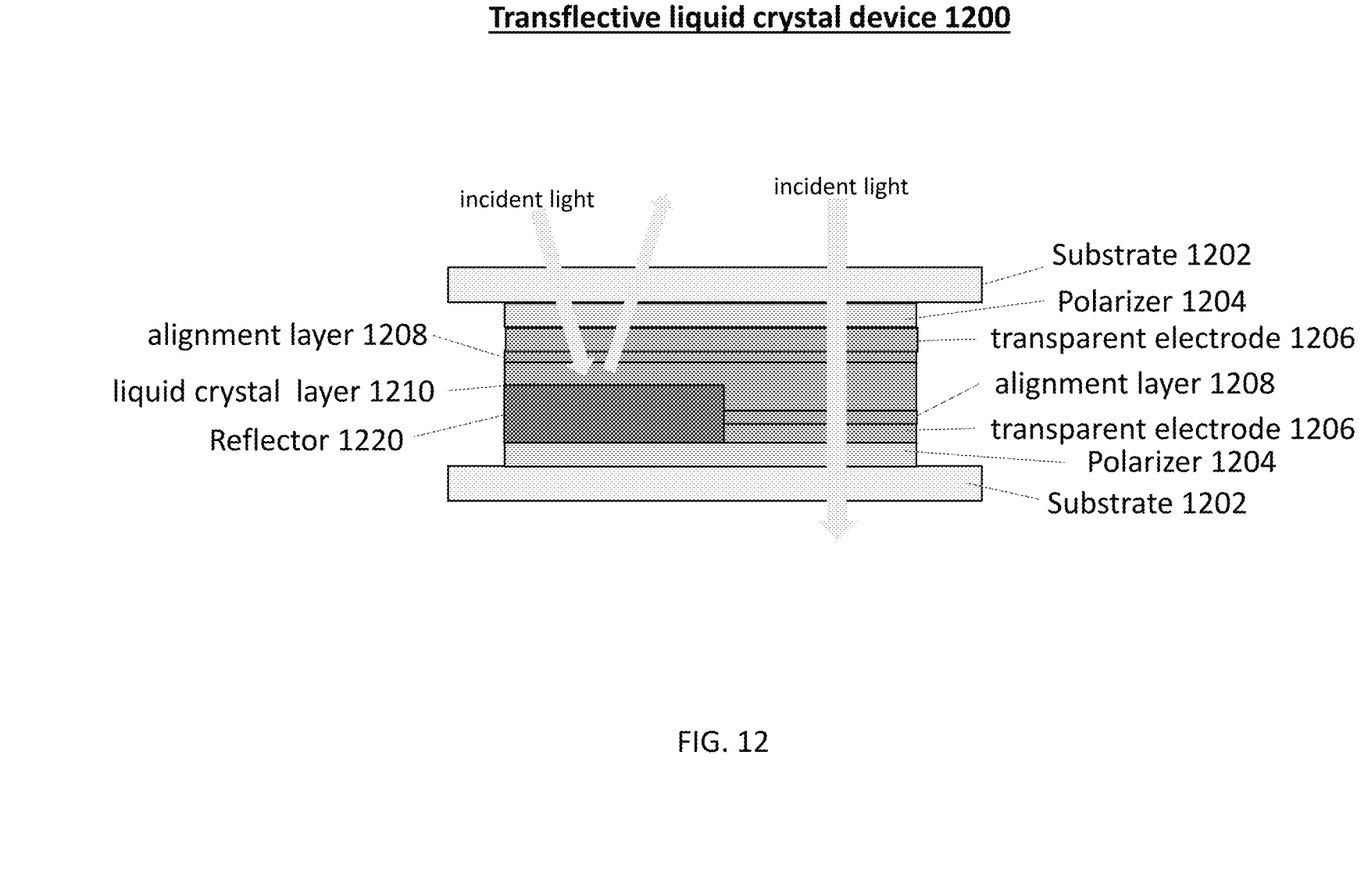
FIG. 12 illustrates a transflective liquid crystal device suitable for use in the augmented reality device of FIG. 10.

FIGS. 11 and 12 show transflective electrochromic and liquid crystal devices, respectively, suitable for use in the transflective AR device 1000 of FIG. 10. As shown in FIG. 11, the transflective electrochromic device 1100 has one side with an electrolyte layer 1108 sandwiched between a cathodic electrochromic layer 1106 and an anodic electrochromic layer 1107, which in turn are between transparent electrodes 1104 and substrates 1102. A fixed reflector 1100 between the substrates 1102 occupies the other side of the transflective electrochromic device 1100. Applying a voltage to the electrochromic device 1100 causes the electrochromic layers 1106 and 1107 to undergo certain redox reactions and change color. The overall transmission (color) of one side of the electrochromic device 800 changes, e.g., from a transparent (clear) state to dark color state and vice versa. This effect can be used to control the ambient light transmitted in an AR device.

As shown in FIG. 12, the transflective liquid crystal device 1200 includes a liquid crystal layer 1210 sandwiched on one side between alignment layers 1208, transparent electrodes 1206, orthogonal or parallel polarizers 1204 (e.g., like the polarizer structure 600 in FIG. 6), and substrates 1202. On the other side of the transflective liquid crystal device 1200, a reflector 1220 displaces at least a portion of the liquid crystal 1210, one alignment layer 1208, and one transparent electrode 1206. Again, the liquid crystal layer 1110 can take the form of a twisted nematic, super twisted nematic, planar aligned, or vertically aligned nematic structure. By applying a voltage across the liquid crystal layer 1110 with the electrodes 1106, or using in-plane switching, the optical transmission for incident unpolarized light can be varied continuously, e.g., between 50% and 0%.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An augmented reality device comprising:
   a display;
   a controller;
   an ambient light sensor, operably coupled to the controller, to sense an ambient light level; and
   a variable transmissive-reflective (transflective) device, operably coupled to the controller and in optical communication with the display, to direct light from the display and ambient light to a user's eye in a proportion determined by the controller based on the ambient light level without totally internally reflecting the light from the display, wherein the variable transflective device comprises:
      a transmissive section to reflect some of the light from the display and to transmit some of the ambient light to the user's eye in the proportion determined by the controller based on the ambient light level; and
      a reflective section, next to the transmissive section, to reflect some of the light from the display to the user's eye and to block some of the ambient light.

2. The augmented reality device of claim 1, wherein the variable transflective device comprises a reflective section having a variable reflectivity.

3. The augmented reality device of claim 1, wherein the transmissive section comprises at least one liquid crystal layer.

4. The augmented reality device of claim 1, wherein the transmissive section comprises an electrochromic layer.

5. The augmented reality device of claim 1, wherein the controller is configured to switch the variable transflective device between a first splitting ratio and a second splitting ratio at a rate faster than a flicker fusion threshold of the user and a duty cycle selected to provide the proportion determined by the controller based on the ambient light level.

6. The augmented reality device of claim 5, wherein the controller is configured to change the duty cycle based on a change in the ambient light level sensed by the ambient light sensor.

7. An augmented reality device comprising:
a display;
a controller;
an ambient light sensor, operably coupled to the controller, to sense an ambient light level; and
a variable transmissive-reflective (transflective) device, operably coupled to the controller and in optical communication with the display, to direct light from the display and ambient light to a user's eye in a proportion determined by the controller based on the ambient light level without totally internally reflecting the light from the display,
wherein the variable transflective device comprises a reflective section having a fixed reflectivity.

8. The augmented reality device of claim 7, wherein the fixed reflectivity is less than 100%.

9. A method of operating an augmented reality device comprising a display, a controller, an ambient light sensor, and a variable transmissive-reflective (transflective) device, the method comprising:
displaying an image with the display;
sensing an ambient light level with the ambient light sensor; and
directing the image from the display and ambient light to a user's eye via the variable transflective device in a proportion based on the ambient light level without totally internally reflecting the image,
wherein the variable transflective device comprises a reflective section having a fixed reflectivity less than 100% and reflecting the image comprises reflecting the image off the reflective section so as to superimpose the image on a real-world scene.

10. The method of claim 9, further comprising:
switching the variable transflective device between a first splitting ratio and a second splitting ratio at a rate faster than a flicker fusion threshold of the user and a duty cycle selected to provide the proportion determined by the controller based on the ambient light level.

11. The method of claim 10, further comprising:
detecting a change in the ambient light level sensed with the ambient light sensor; and
changing the duty cycle in response to the change in the ambient light level.

12. The method of claim 9, further comprising:
varying a reflectivity of the variable transflective device.

13. An augmented reality device comprising:
a display;
a controller;
an ambient light sensor, operably coupled to the controller, to sense an ambient light level; and
a variable transmissive-reflective (transflective) device operably coupled to the controller and in optical communication with the display, the variable transflective device comprising:
a reflective section having a fixed reflectivity to reflect some light from the display to a user's eye and to block some ambient light; and
a transmissive section, side-by-side the reflective section, to reflect some of the light from the display and to transmit some of the ambient light to the user's eye in a proportion determined by the controller based on the ambient light level.

14. The augmented reality device of claim 13, wherein the transmissive section comprises at least one of a liquid crystal layer or an electrochromic layer.

15. The augmented reality device of claim 13, wherein the controller is configured to switch the variable transflective device between a first splitting ratio and a second splitting ratio at a rate faster than a flicker fusion threshold of the user and a duty cycle selected to provide the proportion determined by the controller based on the ambient light level.

16. The augmented reality device of claim 15, wherein the controller is configured to change the duty cycle based on a change in the ambient light level sensed by the ambient light sensor.

17. The augmented reality device of claim 13, wherein the fixed reflectivity is less than 100%.

* * * * *